(No Model.)

W. P. KOOKOGEY.
ELECTRODE FOR GALVANIC BATTERIES.

No. 425,135. Patented Apr. 8, 1890.

WITNESSES:
Harry M. Requa Jr.
Charles M. Dumond.

INVENTOR:
William P. Kookogey
BY Salter S. Clark
his ATTORNEY

UNITED STATES PATENT OFFICE.

WILLIAM P. KOOKOGEY, OF BROOKLYN, NEW YORK, ASSIGNOR TO THE KOOKOGEY CHEMICAL LIGHT AND POWER COMPANY.

ELECTRODE FOR GALVANIC BATTERIES.

SPECIFICATION forming part of Letters Patent No. 425,135, dated April 8, 1890.

Application filed December 11, 1889. Serial No. 333,365. (No model.)

*To all whom it may concern:*

Be it known that I, WILLIAM P. KOOKOGEY, of the city of Brooklyn, county of Kings, and State of New York, have invented a new and useful Element for Galvanic Batteries, of which the following is a specification.

My invention relates to the form of the negative element in a primary galvanic battery, and its main object is to provide a battery which will not polarize.

It consists, in substance, of a negative element made up of small wires or filaments electrically connected together—*i. e.*, the active surface of the element is to be composed largely or wholly of wires, and such wires are to be of such small diameter that the bubbles of hydrogen will not remain attached to them, but will pass off.

By "negative element" herein I mean that element of the battery which forms the positive pole or electrode when the battery is in action—*e. g.*, the copper or carbon.

Figure 1:
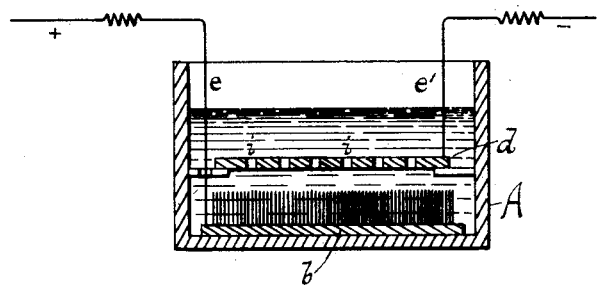
Figure 2:
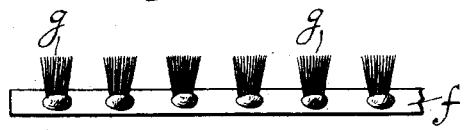
Figure 3:
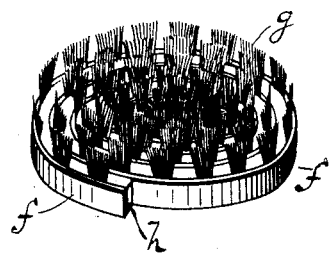
Figure 4:
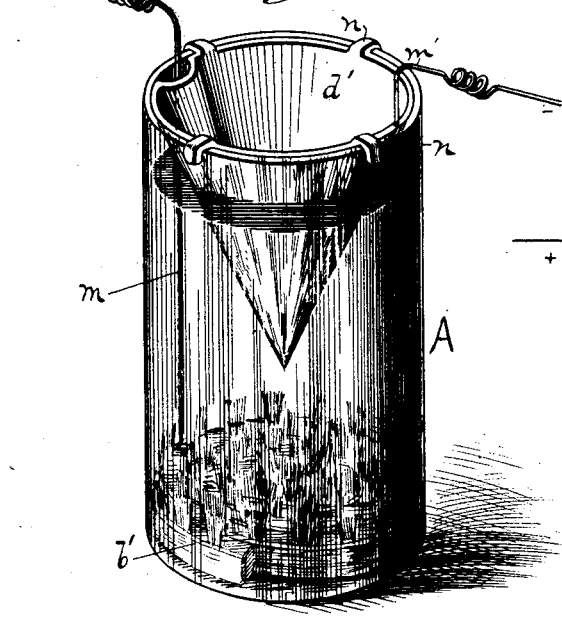
Figure 5:
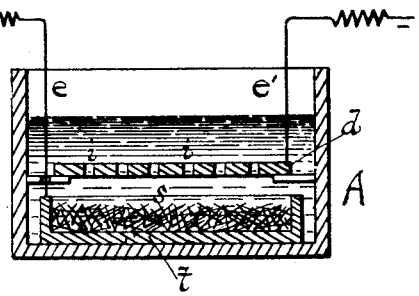

In the accompanying drawings, in which the same characters indicate analogous parts, Figure 1 is a diagram illustrating the principle of the invention. Figs. 2, 3, and 4 show a method of practically using it; and Fig. 5 is a modification.

A is a battery-jar to contain the battery elements and the electrolyte. The negative element $b$ consists of a series of very thin wires electrically connected together and having a conductor $e$. The positive element $d$ is supported in the jar above the negative element $b$ and is provided with a conductor $e'$. The wires composing the negative element $b$ may be made of copper and connected together in any appropriate way to accomplish good electrical connection. They should be of sufficiently small diameter so that the minute bubbles of hydrogen which ordinarily collect upon the negative element of a battery under action and polarize it will be unable to attach themselves to the wires, or if attached for a moment will pass off at the points of the wires. The openings $i$ through the zinc $d$ afford a passage for the escaping hydrogen, so that it will not collect on the under surface of the element $d$. Other methods to allow the escape of the hydrogen may be substituted.

The principal advantage attained in an element made up of a collection of fine filaments (as this would be substantially) is the prevention of polarization; but there is another advantage resulting from such form—viz., the large amount of surface afforded in proportion to space occupied.

The main principle of the invention—viz., a negative element made up of filaments or wires of small diameter—is capable of very many and wide variations. I do not mean to confine myself either to any particular material for the wire or filaments, nor to any particular size of wire, nor any method of attaching the wires together, or of attaching them to the conductor which leads to the external circuit. The element itself may be made of any convenient shape. The filaments need not necessarily be arranged with regularity. Thus a quantity of short filaments (say two inches long) may be placed irregularly in the bottom of a vessel of conducting material, which is itself placed in the jar. The filaments and the vessel together constitute the element in that case. This is shown in Fig. 5, where $t$ represents the vessel, and $s$ the filaments.

As to material, while I claim that the invention covers any material negative to zinc which may be put into the form of filaments or wires, yet there is great superiority in copper wire. Some form, also, in which the wires are made to stand erect with some degree of regularity and having one or both ends free, would be greatly superior, so far at least as polarization is concerned. This would make the negative element substantially a brush. Such a form is shown in Figs. 2, 3, and 4.

In Fig. 2, $f$ is a strip of copper, to which bunches of copper wire $g$ are designed to be soldered at intervals. The strip $f$, with the bunches of small wires soldered or fastened to it, is then to be wound or coiled into the form shown in Fig. 3. Layers of cement or other insulating material lie between the coils of the copper strip $f$. The object of the cement, however, is only to prevent local action at the soldered points. If the wires were held or attached there without the introduction of any other metal—such, for instance, as by brazing them on—nothing need be placed between the coils unless to hold the wires apart. In the drawings the wires are represented, for the sake of clearness, of larger diameter than they would be in practice. This composes the negative element $b'$. (Shown in the bottom of the jar in Fig. 4.) In this form the negative element $b'$ will of course be polarized more or less at the points where the wires approach each other closely, and that will always be more or less so in any form where the wires are arranged without regularity. Nevertheless, owing to their being entirely composed of wire, and thus exposing a very great surface to the action of the liquid, there will still be always sufficient surface of copper exposed and free from hydrogen to make the battery constant.

In Fig. 4 the conductor $m$ leads from the negative element $b'$ and forms its terminal. The positive element $d'$ is shown as a hollow inverted cone of zinc supported in the jar by any appropriate means—such, for instance, as hooks $n$—and having its terminal $m'$. The only object of the conical shape is to prevent the bubbles of hydrogen lodging there as they pass upward.

I claim as my invention—

1. A negative element for primary galvanic batteries, consisting of a number of short sections of fine wires or filaments, so as to present a number of points to the electrolyte, said wires or filaments being placed in a vertical position in the battery, substantially as and for the purpose described.

2. A negative element for primary galvanic batteries, consisting of a large number of fine wires or filaments electrically connected together on a band or strip of metal, said band or strip being rolled, folded, or otherwise mechanically connected in the form of a brush, substantially as and for the purposes described.

3. As an article of manufacture, a conducting metal strip having bunches of short fine wires fastened to it at intervals, such strip and wires being adapted for coiling into the form of a brush of wires for use as a negative element in a primary galvanic battery, substantially as and for the purpose described.

In witness whereof I hereunto set my hand, this 7th day of December, 1889, in the presence of two witnesses.

WM. P. KOOKOGEY.

Witnesses:
   CHARLES S. FINDLAY,
   ARTHUR E. WALRADT.